June 16, 1925.

J. P. GANTT

BATTERY CHARGING SWITCHBOARD

Filed June 20, 1924

Inventor
Jacob Plannie Gantt.

By Donald L. Maxson.
Attorney

Patented June 16, 1925.

1,542,229

UNITED STATES PATENT OFFICE.

JACOB PLANNIE GANTT, OF WAGENER, SOUTH CAROLINA.

BATTERY-CHARGING SWITCHBOARD.

Application filed June 20, 1924. Serial No. 721,374.

*To all whom it may concern:*

Be it known that JACOB PLANNIE GANTT, a citizen of the United States, residing at Wagener, in the county of Aiken and State of South Carolina, has invented certain new and useful Improvements in Battery-Charging Switchboards, of which the following is a specification.

This invention relates to improvements in battery charging switch boards, and more particularly to a highly efficient type of switch board which will be used for quickly turning on or off a battery from a charging circuit.

An object of the invention is to provide a switch board for use in connection with a battery charging service station, which will eliminate the usual waste of time in always replacing a partly charged battery in the charging circuit when a fully charged battery is removed therefrom.

A further object of the invention is to provide a switch board for use in battery charging service stations, which will be provided with a separate switch arm for every battery connected in the charging circuit.

Other objects will appear as the description proceeds.

In the accompanying drawings which form a part of my application,

Like characters of reference are used throughout the following specification and the accompanying drawings to designate corresponding parts.

Figure 1:
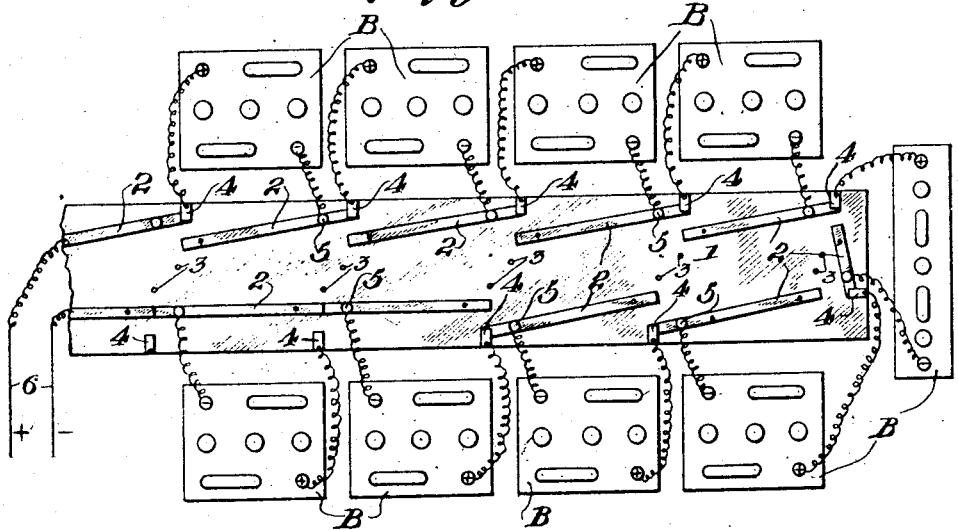
Figure 1 is a plan view of my improved switch board showing the same connected with a plurality of storage batteries, and in circuit with the battery charging line.

My improved battery charging switch board comprises a panel 1, on which the switch arms 2 are pivotally mounted. Stop pins 3 are positioned adjacent the ends of the said arms, on the panel 1, and serve to limit the movement thereof.

The cooperating switch contacts 4 are positioned along one side of the panel 1, and are so arranged that the adjacent ends of the switch arms 2 may be thrown into and out of engagement therewith, at will. The switch arms are further provided with the operating knobs 5 for use in manipulating the switches.

Figure 2:
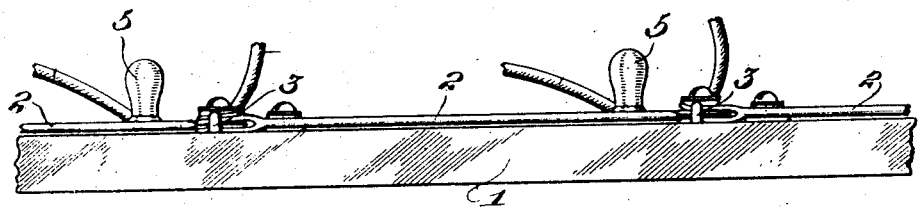
Figure 2 is a side elevation of a portion of my switch board, showing the relative positioning of several of the switch arms.
Figure 3:
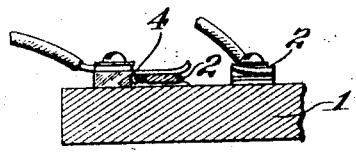
Figure 3 is a sectional view taken through a portion of the board and switches.

In Figure 1 of the drawings, I have illustrated the switch board connected with nine storage batteries B which are respectively controlled by the switch arms 2 and are connected in series with a charging line 6. The ends of the several switch arms adjacent the stop pins 3 are bifurcated, as best illustrated in Figures 2 and 3 of the drawings, while their opposite ends are formed of a single bar or pole. The switch contacts 4 are also bifurcated, as best illustrated in Figure 3 of the drawings, and are adapted to receive the pole ends of the several switch arms.

The wiring circuit may easily be traced, and runs from the positive line wire to the first switch 2 and through the first battery to the second switch, and so on in series until the last switch connects with the negative line wire. Therefore, all of the batteries will be connected in series and each battery will have a separate controlling switch.

Heretofore, it has been necessary when a fully charged battery is removed from the circuit, to stop and immediately place a partially discharged battery in its place to complete the circuit so that the charging operation may continue, but, with my invention, when a battery is fully charged, the switch arm controlling the battery is moved from the contact to the adjacent bifurcated end of the next switch arm. In Figure 1, the battery adjacent the negative line wire is removed from the charging circuit. In this manner, much time is saved for the man in charge of the charging station, and also there is practically no interruption to the charging circuit connected with the remaining batteries.

From the foregoing description it will be particularly apparent that I have provided a simple, inexpensive and highly efficient battery charging switch board, which will render battery charging as near foolproof as possible.

Many minor changes in detail of construction may be resorted to without departure from the spirit of the invention.

Having thus described my invention what I claim as new and desire to secure by Letters Patent of the United States is:

1. A battery charging switch board comprising a panel, a plurality of alined switch arms pivotally mounted thereon, a switch contact mounted on said panel adjacent the free end of each of said switch arms, and means at the inner ends of each switch arm for receiving the adjacent free end of the next switch arm.

2. A battery charging switch board comprising a panel, a plurality of alined switch arms pivotally mounted thereon, switch contacts mounted on said panel adjacent the free ends of said switch arms, a plurality of batteries connected with said arms and contacts to complete a circuit, and means on the inner ends of said arms adapted to receive the adjacent free ends of the next switch arms for operation to cut out a particular battery from the circuit.

3. The subject matter set forth in claim 1, and stop pins on said panel to limit the movement of said switch arms.

4. The subject matter set forth in claim 1, and said means at the inner ends of said arms being bifurcated to receive the free ends of the adjacent arms.

5. A battery charging switch board comprising a panel, a plurality of alined switch arms pivotally mounted thereon, switch contacts mounted on said panel adjacent the free ends of said switch arms, a plurality of batteries connected with said arms and contacts, whereby any one of said batteries may be cut from the circuit, and the circuit remain complete.

In testimony whereof I affix my signature.

JACOB PLANNIE GANTT.